Patented Dec. 15, 1953

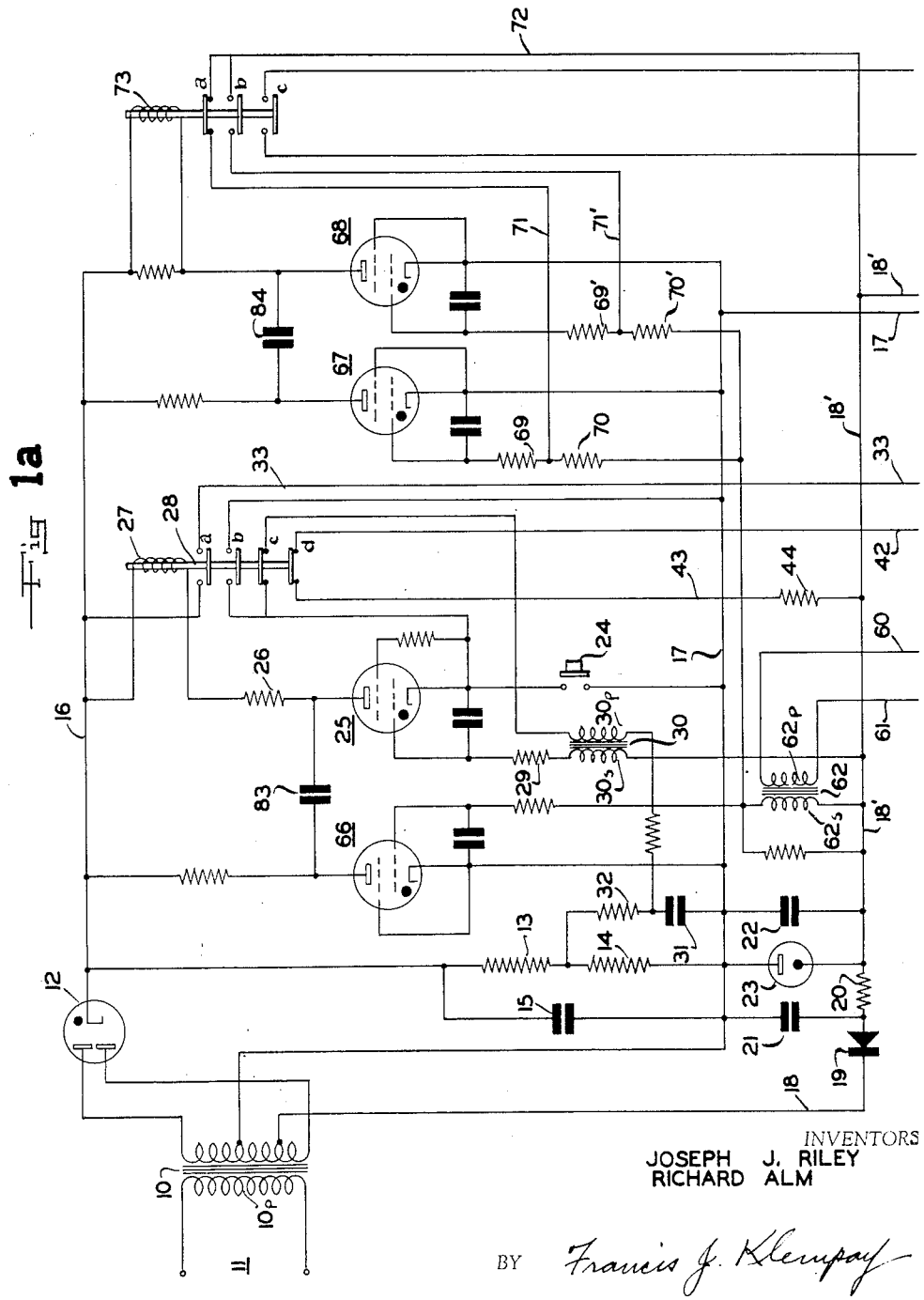

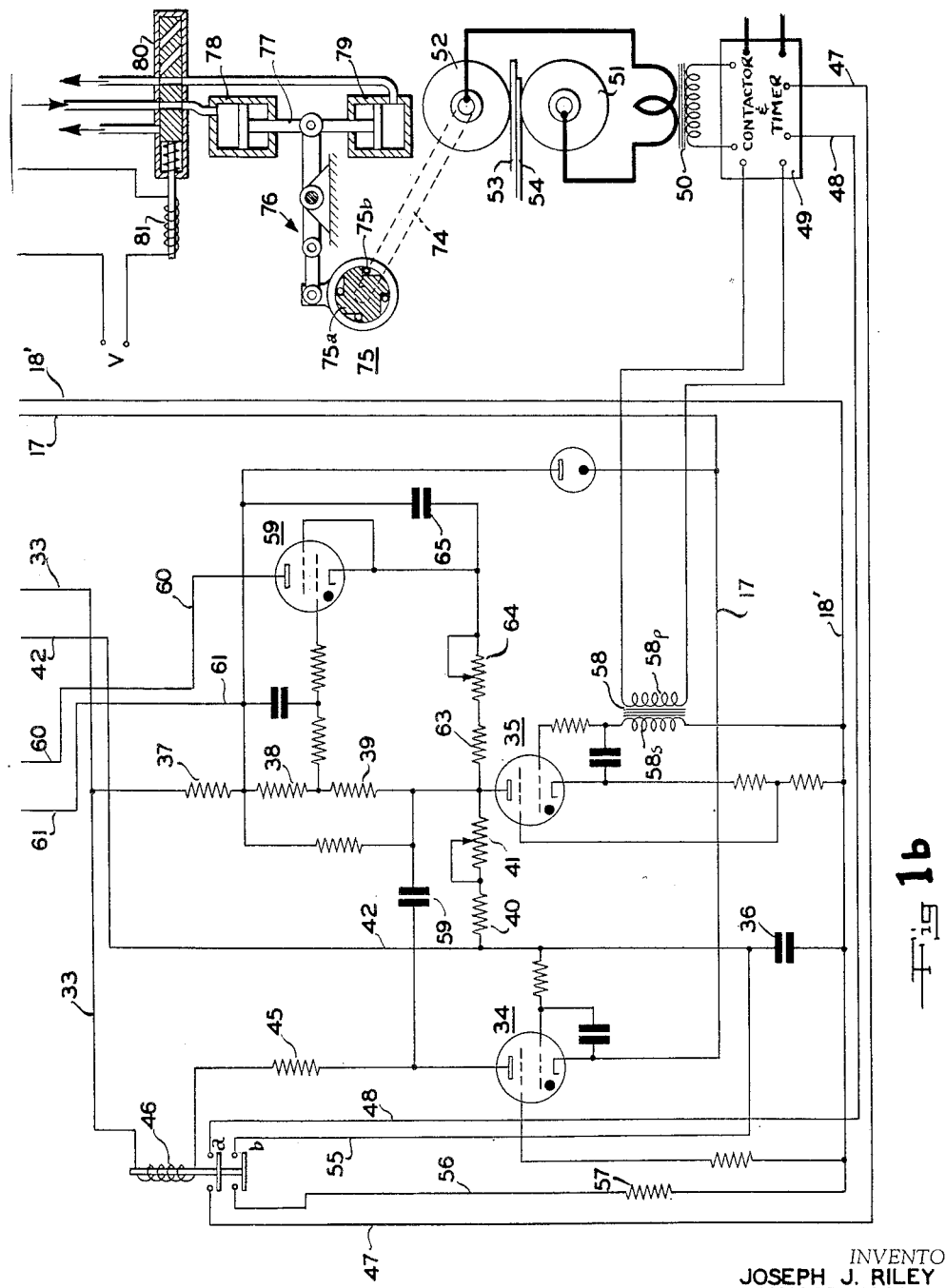

2,662,959

UNITED STATES PATENT OFFICE 2,662,959

ELECTRONIC SEQUENCE CONTROL FOR INTERMITTENT OPERATION OF ROTARY ELECTRODE WELDING APPARATUS

Joseph J. Riley and Richard Alm, Warren, Ohio, assignors to The Taylor-Winfield Corporation, Warren, Ohio, a corporation of Ohio Application February 11, 1952, Serial No. 270,932

8 Claims. (Cl. 219—4)

1

The present invention relates to sequence control arrangements for electric resistance welding apparatus and has particular application in controlling the operation of rotary electrode apparatus wherein accurately regulated step-by-step movement of the electrodes along the workpieces is desired.

It is an object of the present invention to provide a simple and practical control circuit for use with "roller spot" welding apparatus wherein intermittently operated indexing means is provided for moving the welding electrodes across the workpieces between applications of welding energy thereto whereby a plurality of spaced spot welds may be provided over the surface of metal strips or sheets, for example.

As will appear hereinafter our control arrangement finds particularly meritorious application in welding systems employing adjustable electrode indexing apparatus of the type shown and described in co-pending application Ser. No. 259,168, filed November 30, 1951, of Melvin M. Seeloff and Donald M. Campbell, entitled "Indexing Mechanism." The above identified application describes a mechanism adapted to effect intermittent movement of rotary electrode wheels in infinitely adjustable increments whereby accurate spacing of welds may be obtained. The described mechanism also includes an arrangement whereby a complete indexing movement of the electrodes is obtained, for example, upon energization of a control switch or valve for the mechanism, and another complete indexing movement is obtained upon subsequent deenergization of the control switch or valve. Thus, in providing a control circuit for such indexing apparatus, arrangements must be provided whereby an index control switch or valve will be energized at the proper point in one cycle, but whereby it will also be deenergized at that same point in the next succeeding cycle. Accordingly the present invention seeks to provide a novel and practical control circuit arrangement whereby alternate energization and deenergization of suitable index control means may be obtained at exact predetermined points in succeeding alternate welding cycles.

Another object of the present invention is the provision of a welding cycle sequencing control circuit for use with indexing apparatus of the above described general character wherein means are provided for readily adjusting the duration of the timed period allotted for an indexing operation whereby substantially immediately upon the termination of indexing movement of the

2 electrode wheels a subsequent phase of the welding cycle, as for example the welding phase, may be initiated. It will be understood that where an adjustment of the indexing movement of the welding electrodes is made, as for example an adjustment from a relatively large movement to a small movement, the time required to complete such movement will be substantially reduced. Thus, to avoid unnecessary waste of time during a complete control cycle we have provided means for quickly and accurately adjusting the "index time" of a control cycle to conform with the time required for the actual movement of the electrodes to take place.

Another object of the present invention is the provision in electronic control apparatus having the above named characteristics of a novel and extremely simple arrangement whereby but a single adjustment is required to effect properly timed energization of an index controlling valve or switch in one cycle and to effect deenergization of such valve or switch at the exactly same point in the next succeeding control cycle. The proposed arrangement eliminates the need for mechanical devices such as ratchet relays and the like and accordingly reduces the time required for the indexing operations.

Yet another object of the invention is the provision of an electronic sequencing circuit for use particularly in electric resistance welding apparatus of the roller spot type which is adapted to effect indexing movement of the welding electrodes during each complete control cycle and to automatically effect recycling of the control whereby upon a single initiation of the control a complete welding operation, comprising a large number of spaced spot welds, may be performed.

In conjunction with the above and with the above stated object of providing a readily adjustable "index time," it is an object of this invention to provide a sequence control circuit wherein recycling may be effected in an absolute minimum of time to thus further reduce the time lapse between applications of welding energy to the workpieces.

The above and other objects and advantages of the invention will become apparent upon full consideration of the following detailed specification and accompanying drawing wherein is illustrated a preferred embodiment of the invention.

In the drawing:

The sole figure of the drawing, shown in two parts, Figure 1a and Figure 1b, is a schematic representation of an electronic sequence control constructed according to the teachings of our invention and employed in "roll-stop" welding apparatus.

In Figure 1a the reference numeral 10 designates a conventional power transformer the primary winding 10p of which is connected to a suitable commercial A. C. power source 11. The secondary winding 10s of transformer 10 is connected at each end terminal to an anode member of a double-anode rectifier discharge device 12. The common cathode element of discharge device 12 is connected through bleeder resistors 13 and 14 and through filtering capacitor 15 to a center tap of secondary winding 10s whereby upon application of power from the source 11 a filtered full-wave D. C. potential will appear across resistors 13 and 14. Positive and negative line conductors 16 and 17 respectively are connected across resistors 13 and 14 to furnish operating potential for a plurality of discharge devices and other electrical components of our circuit as will appear. Accurately regulated biasing potential for the various discharge devices is supplied by means of conductors 18 and 18', the former of which is connected at an intermediate tap to secondary winding 10s, and other conventional components including a rectox 19, resistor 20, capacitors 21 and 22 and glow discharge tube 23.

Connected across the line conductors 16 and 17, in series relation, are an initiating switch 24, gaseous discharge device 25, resistor 26, and the operating coil 27 of a relay 28 having normally open contacts 28a and 28b, and normally closed contacts 28c and 28d. Discharge device 25 is of the grid controlled type and the grid circuit therefor comprises a current limiting resistor 29 and secondary winding 30s of an impulse transformer 30. The last mentioned elements 29 and 30s are referenced to the source of biasing potential at conductor 18' whereby discharge device 25 is rendered normally non-conducting.

As will later be more fully understood a control cycle is initiated by causing discharge device 25 to conduct whereby relay 28 is energized. In accordance with the principles of the invention we may cause discharge device 25 to conduct at the desired time by providing a suitable impulse signal at primary winding 30p whereby the control grid of discharge device 25 becomes at least momentarily positive. For this purpose we have connected one side of the primary winding 30p to one terminal of a capacitor 31 and the other side of the winding 30p through normally closed contacts 28c to the cathode of discharge device 25. The other terminal of the capacitor 31 is connected to line conductor 17. Thus it will be apparent that with capacitor 31 charged to a suitable potential and to the proper polarity closing of initiating switch 24 will form a discharge path for capacitor 31 through primary winding 30p whereby a positive grid impulse may be applied to discharge device 25 to condition the same for conduction. Closing of switch 24 also furnishes anode-cathode potential to the discharge device 25 and the same will then continue to conduct until such anode-cathode potential is subsequently removed.

For charging the capacitor 31 whereby an initiating pulse may be furnished as above described we have connected the same, through a current limiting resistor 32, across bleeder resistor 14 of the D. C. power supply. Thus charging potential will appear across the terminals of the capacitor 31 at all times when the circuit is energized and the capacitor will be maintained at full charge unless a discharge path is provided by closing of the initiating switch 24. It will be noted, however, that since the discharge path for capacitor 31 includes normally closed contacts 28c the discharge path may be closed but momentarily, i. e. during the interval between the closing of switch 24 and the subsequent energization of relay 28. This arrangement, as will appear, is effective in reducing to an aboslute minimum the time required to recycle the control apparatus during continuous operation thereof.

Upon energization of the relay 28 and closing of contacts 28a thereof, line conductor 16 is connected to a conductor 33 whereby through the conductor 33 and line conductor 17 operating potential may be supplied to a pair of gaseous discharge devices 34 and 35 (see Figure 1b). Discharge device 34 is of the type having a screen and control grid and in the illustrated embodiment of the invention both grids are connected to the bias potential conductor 18' whereby in order to fire the discharge device 34 the control grid thereof must be substantially positive with respect to the cathode.

Included in the control grid circuit for discharge device 34 is a timing capacitor 36. One terminal of capacitor 36 is connected to conductor 18' while the second terminal, in addition to being connected to the grid of discharge device 34, is connected through resistors 37—40 and timing potentiometer 41 to conductor 33. Conductors 33 and 18' constitute a source of charging potential for capacitor 36; the rate of such charging being determined by the series connected resistance and being adjustable by means of potentiometer 41. Normally, however, capacitor 36 is shunted by means of conductor 42, normally closed contacts 28d, conductor 43 and low value resistor 44 whereby susbtantially no voltage is applied at the control grid of discharge device 34. Upon energization of relay 28 the shunt is disconnected and capacitor 36 begins to charge at a predetermined rate causing discharge device 34 to conduct a predetermined time thereafter. The time interval between the firing of discharge devices 25 and 34 is known as "index time" and, as will later appear, it is during this interval that the welding electrodes are moved a predetermined distance across the workpieces.

It is contemplated that in the described arrangement discharge device 34 will be rendered conductive after capacitor 36 has been charged to a potential which is substantially less than half the available charging potential. The timing period is thus inherently accurate even where substantial fluctuations occur in the charging potential.

Connected in series with the anode of discharge device 34 are resistor 45 and relay 46 having normally open contacts 46a and 46b. Relay 46 will of course become energized by conduction in discharge device 34. Contacts 46a are associated through conductors 47 and 48 with a conventional weld contactor and timer 49, and it is contemplated that closing of contacts 46a will initiate the flow of weld current through weld transformer 50 and electrodes 51 and 52 to workpieces 53 and 54; the contactor also serving to time the duration of the weld through any of various well-known means. Contacts 46b, when closed by energization of relay 46, provide along with conductors 55 and 56 and resistor 57 a second shunt path for capacitor 36 whereby the charging potential is removed therefrom. Discharge device 34, being of the gaseous or mercury arc type will, however, continue to conduct regardless of the reduction in control grid potential.

Discharge device 35, which is connected across conductors 33 and 17 through resistors 37—39, is maintained in a normally non-conductive state by means of a control grid bias which is applied thereto from conductor 18′. Included in the control grid circuit is the secondary winding 58s of an impulse transformer 58. The primary winding 58p is connected to the contactor and timer 49 and according to the principles of the invention the latter will include means operative upon the timing out of the "weld time" period, or upon the completion of a predetermined portion of the "weld time" period, to impress a positive potential pulse upon winding 58p which is sufficient to cause discharge device 35 to begin conducting. Such means may comprise, for example, a discharge device connected in series with the winding 58p and operative upon completion of a predetermined energization time of the contactor 49 to conduct, sending a pulse of electric energy to the winding 59p. Arrangements of this type are common in the art as illustrated in U. S. Patent No. 2,493,839 to C. W. Thomas et al., where a gaseous discharge device begins to conduct after a weld time period of predetermined length to deenergize a weld contactor and initiate a new control period.

Connected between the anodes of discharge devices 34 and 35 in conventional "flip-flop" manner is a capacitor 59 which is effective upon the firing of discharge device 35 to momentarily place a negative potential upon the anode of discharge device 34 rendering the same non-conductive to deenergize relay 46, open contacts 46a and reset the weld contactor 49. It will be noted that contacts 46b and 28d will be concurrently open at this time and accordingly both shunt circuits for capacitor 36 will be open allowing the latter to recharge. With discharge device 35 conducting, however, the charging potential for capacitor 36 will be the sum of the biasing potential between conductors 17 and 18′ and the arc drop across discharge device 35. Hence the positive control grid signal upon discharge device 34 is merely the arc drop of discharge device 35, and since the screen grid of discharge device 34 is highly negative the slight positive signal upon the control grid is insufficient to cause discharge device 34 to refire.

Upon termination of the "weld time" period it is common practice to provide a "hold time" period wherein the electrodes are held in welding position in the absence of any flow of welding energy whereby the weld may solidify and cool sufficiently to insure adequate bonding of the metal. For this purpose we have provided a grid controlled gaseous discharge device 59 which is connected across resistors 38 and 39 through conductors 60 and 61 and the primary winding 62p of an impulse transformer 62. Connected in series with the cathode of discharge device 59 are resistor 63 and potentiometer 64 of high resistance value, and connected in parallel with discharge device 59 is a capacitor 65. The control grid of the device 59 is connected between resistors 38 and 39 and thus it will be apparent that upon a sufficient anode-cathode potential appearing across capacitor 65 discharge device 59 will be rendered conductive. Capacitor 65 will of course begin to charge immediately upon the firing of discharge device 35 and the potential at the terminals of the capacitor, and hence at the anode and cathode of discharge device 59 will build up at a predetermined rate as according to the setting of potentiometer 64. Thus, a predetermined time subsequent to the firing of discharge device 35, discharge device 59 will be rendered conductive. This variable delay period is utilized to provide a "hold time" as will appear.

Conduction in discharge device 59 causes an impulse to be sent through conductors 60 and 61 to the primary winding 62p, and this impulse is translated into the secondary coil 62s which forms a part of the control grid circuit of each of a pair of negatively biased gaseous discharge devices 67 and 68 connected across line conductors 16 and 17. As shown in Figure 1a the control grid circuits for each of the discharge devices 67 and 68 include a pair of resistors 69 and 70 or 69′ and 70′. Connected between resistors 69 and 70 in the grid circuit for discharge device 67 are conductors 71 and 72 and normally closed contacts 73a of a relay 73. Conductor 72 is connected to the bias potential conductors 18′ whereby the impulse transformer 62 is normally shunted out of the control grid circuit for discharge device 67. A similar arrangement is provided for discharge device 68, i. e., conductors 71′ and 72 and contacts 73b, except that contacts 73b are normally open whereby impulse transformer 62 is normally included in the grid circuit of discharge device 68. Thus it will be apparent that upon the firing of discharge device 59 the resultant impulse sent to transformer 62 will cause discharge device 68 to conduct.

According to the teachings of the invention the operating coil of relay 73 is connected in series with discharge device 68 and hence the relay 73 will become energized at the end of the "hold time" period.

It is desirable at this time to index the electrodes 51 and 52 to a new welding position for a subsequent welding operation, and accordingly we have provided means including normally open contacts 73c of relay 73 to effect such indexing movement. The preferred apparatus for indexing electrodes 51 and 52 is described in detail in the previously mentioned co-pending application Ser. No. 259,168, filed November 30, 1951, and thus we have included herein only a schematic representation of such apparatus.

In the arrangement shown one of the welding electrodes 52 is operatively connected by means of a shaft 74 to the driven member 75a of conventional overrunning clutch 75. The driving member 75b of the clutch is connected by means of a toggle mechanism 76 to a vertically movable piston rod 77 adapted to be operated upwardly or downwardly by actuators 78 and 79 positioned at the upper and lower ends respectively of the piston rod 77. As indicated in the drawing the piston rod 77 is adapted to be moved in either direction from the dead center position of the toggle mechanism 76 and it will be understood that in a full stroke movement of the rod 77 the toggle mechanism will move from a given position through dead center to a position at the opposite side of dead center corresponding to the starting position of the toggle mechanism. Accordingly the driven member of clutch 75 will first move in a driving direction and then in a free wheeling direction. The movement in the driving direction will cause the electrode 52 to be indexed to a new welding position, and it will be readily understood that the magnitude of such movement may be adjusted by merely adjusting the length of stroke of the rod 77. Means for accomplishing this are described in the above referred to co-pending application.

It will be noted that in the arrangement shown indexing movement of the electrode 52 will occur during the first half stroke of the rod 77 regardless of whether the same is moving upwardly or downwardly. Thus we provide that at the end of one welding cycle actuator 79, for example, will be energized to cause upward movement of the rod 77, and at the end of the next succeeding welding cycle actuator 78 will be energized to cause downward movement of the rod 77. To accomplish this we have provided a solenoid operated four-way valve 80 which in a deenergized condition connects actuator 78 with a source of air or hydraulic fluid, not shown, and actuator 79 with exhaust. Piston rod 77 is thus normally in the lower position.

Upon the timing out of the "hold time" period and the resultant firing of discharge devices 59 and 68 contacts 73c close to connect the operating coil 81 of valve 80 with a suitable power source V. The plunger of valve 80 is accordingly shifted to the left connecting actuator 79 with the source of air or fluid, not shown, whereby rod 77 is moved upwardly to index electrode 52.

Operative substantially simultaneously with the initiation of the indexing of electrode 52 we have provided means adapted to recycle the control apparatus for a subsequent control cycle or to terminate the welding operation as may be desired. In the illustrated embodiment we have utilized for this purpose a grid controlled gaseous discharge device 66 which is connected across line conductors 16 and 17. The control grid circuit for discharge device 66 is referenced to conductor 18 and includes the secondary winding 62s of impulse transformer 62. Thus at the end of a "hold time" period, when impulses are impressed in the grid circuits of discharge devices 67 and 68, a like impulse is impressed upon the control grid of discharge device 66 to render the latter conductive. Thus, by connecting a capacitor 83 in conventional "flip-flop" arrangement between the anodes of discharge devices 66 and 25 we may utilize the impulse provided by transformer 62 to extinguish discharge device 25 and terminate a control cycle.

If recycling operation is desired the initiating switch 24 may be held closed whereby upon discharge device being extinguished and relay 28 becoming deenergized contacts 28c will close to provide a discharge path for capacitor 31 through transformer 30. As a result discharge device 25 is immediately refired to initiate a new cycle of operation. Discharge device 66 is extinguished by the action of capacitor 83.

It will be understood that the recycling of the control apparatus as described above will take place substantially instantaneously and hence a new cycle will begin at the start of an index operation. Thus it will be apparent that by proper adjustment of timing potentiometer 41 we may so regulate the "index time" period that discharge device 34 will conduct to begin a weld substantially at the instant the toggle mechanism 76 reaches dead center position. If the length of the indexing stroke of rod 77 is increased or decreased, potentiometer 41 may be commensurately adjusted so that the flow of weld current does not begin before or after electrode 52 has stopped, but substantially at the same instant it is stopped. We thus provide that the welding energy delivered at the electrodes 51 and 52 may be utilized in the most effective manner with a minimum waste of time.

In the preceding we have described a single cycle of operation wherein during the "index time" period the piston rod 77 is moved upwardly in response to energization of valve 80. At the end of the next succeeding cycle it is necessary to deenergize valve 80 to cause the rod 77 to move downwardly. This we accomplish by a novel arrangement of discharge devices 67 and 68 whereby the same fire alternately in succeeding cycles in a continuing series thereof. As shown in Figure 1a a capacitor 84 connects the discharge devices 67 and 68 in "flip-flop" manner whereby firing of one of the devices will render the other non-conductive. Thus, for example, after a control cycle as hereinbefore described wherein indexing movement of electrode 52 was initiated by firing of discharge device 68, contacts 73a are open while contacts 73b are closed, shunting impulse transformer 62 out of the grid circuit for discharge device 68 while connecting it into the circuit for discharge device 67. When the next succeeding impulse is applied to transformer 62 at the end of a "hold time" period discharge device 67 will be rendered conductive causing relay 73 and valve 80 to be deenergized and the rod 77 to be moved downwardly. This arrangement is effective to reduce by half the number of operations of relay 73 and valve 80 thus insuring a substantially longer period of operation thereof. And it will be particularly noted that this is accomplished without in any way affecting the timing accuracy of the apparatus since in each instance a discharge device is rendered conductive to initiate indexing movement of the electrode 52.

To end a continuing series of welds switch 24 is merely released whereby upon discharge device 66 rendering discharge device 25 non-conductive the anode-cathode potential holding circuit through contacts 27b is opened to prevent initiation of a new cycle of operation.

In some instances it has been found desirable to provide a "cool time" period after the "hold time" period wherein the electrodes and/or workpieces are allowed to cool slightly before a new weld is performed. Our circuit arrangement is ideally suited for such a provision since "cool time" may run concurrently with "index time" to insure most effective utilization of the welding apparatus. It is contemplated that means for timing a "cool time" period would be incorporated into the contactor and timer 49 and would be effective to prevent energization of the contactor within a predetermined "cool time" period subsequent to the last preceding "weld time" period. Thus, should "cool time" be longer than "index time" the contactor will remain deenergized, even though relay 46 of the control circuit is energized, until the "cool time" period has timed out. It will be understood that since after energization of relay 46 no further control function takes place until a signal is received by transformer 58 at the end of the "weld time" period any delay within the contactor caused by a "cool time" of longer duration than "index time" will not affect the remaining control phases provided by our circuit. If "cool time" is shorter than "index time" the former will have no effect upon the control cycle.

It should now be apparent that we have accomplished the objects initially set forth. Our control circuit provides a novel and exceptionally useful means of controlling the various sequentially related phases of roller-spot welding operations, and is particularly adapted for use where electrode indexing apparatus of the type requiring energization and deenergization on alternate control cycles is employed.

In contemplation of the use of indexing apparatus having an adjustable indexing movement we have provided an arrangement whereby our control apparatus may be adjusted to provide an "index time" equal to the time required to accomplish a specified mechanical movement of the welding electrodes. This arrangement helps maintain the non-productive time of the welding apparatus at a practical minimum as will be readily understood.

An important feature of our invention is the novel arrangement of discharge devices 67 and 68 and relay 73 whereby the said discharge devices are rendered conductive on alternate cycles to alternately energize and deenergize index control valve 80. The teachings of our invention in this respect eliminate such devices as ratchet relays and the like and accordingly eliminate the time delays inherently caused thereby. It will be apparent, moreover, that the operating life of relay 73 will be substantially double that of an equivalent ratchet relay or similar device requiring energization and deenergization during each control cycle rather than on alternate cycles as is taught herein. Our arrangement is equally accurate in timing the instant of energization or deenergization of relay 73 since impulse transformer 62 is in effect shifted from one control grid circuit to the other of discharge devices 67 and 68 during alternate control cycles. Initiation of the electrode indexing may thus be readily controlled by adjustment of a single potentiometer or other device.

We have also provided a novel arrangement for recycling our control apparatus whereby when initiation switch 24 is held closed discharge device 25 is rendered non-conductive only for that period of time required for relay 28 to drop out of energized position to close contacts 28c and cause capacitor 31 to discharge through transformer 30 to again render discharge device 25 again conductive. It will be apparent that recycling in the manner taught is substantially instantaneous.

The cumulative effect of the various time-saving features of our control circuit apparatus have been manifested in the commercial embodiments thereof where, in welding apparatus utilizing an indexing mechanism as disclosed by related co-pending application Ser. No. 259,168, filed November 30, 1951, as many as four hundred welds per minute are possible. This represents a substantial improvement over apparatus heretofore known in the art.

Having thus described a preferred embodiment of our invention, what we claim as new and desire to secure by Letters Patent is:

1. In control apparatus for electric resistance welding apparatus of the type adapted to perform a plurality of spaced welds in controlled sequence and including means adapted upon alternate energization and deenergization in succeeding control cycles to cause indexing movement of welding electrodes; the combination of a D. C. power supply, a solenoid operated control device adapted upon energization to cause a first indexing movement of said electrodes and upon subsequent deenergization to cause a second indexing movement of said electrodes, relay means associated with said control device for energizing and deenergizing the same, a first gaseous discharge device connected to said power supply and associated with said relay means adapted when conducting to energize said relay means, a second gaseous discharge device connected to said power supply, a capacitor connecting the anodes of said first and second discharge devices whereby initiation of conduction in one of said discharge devices renders the other of said discharge devices non-conductive, said first and second discharge devices having control electrodes, first and second control circuits for the control electrodes of said first and second discharge devices respectively including means to maintain said discharge devices in a non-conductive state, impulse translating means associated with each of said control circuits adapted when energized to impress a starting signal on said control circuits, switching means including normally open and normally closed contacts adapted in response to said first discharge device being non-conductive to provide a low resistance circuit path in said second control circuit in parallel with said impulse translating means whereby upon said impulse translating means being energized only said said first discharge device will be rendered conductive and responsive to conduction in said first discharge device to provide a similar low resistance circuit path in said first control circuit whereby upon the next subsequent energization of said impulse translating means only said second discharge device will be rendered conductive, and means associated with said welding apparatus and responsive to the termination of a welding operation therein to energize said impulse translating means.

2. In control apparatus for electric resistance welding apparatus of the type adapted to perform a plurality of spaced welds in controlled sequence and including means adapted upon alternate energization and deenergization in succeeding control cycles to cause indexing movement of welding electrodes; the combination of a D. C. power supply, first and second discharge devices connected across said power supply, each of said discharge devices having a control electrode, first and second control circuits for the control electrodes of said first and second discharge devices respectively, means in said control circuits for maintaining said discharge devices normally non-conductive, a control device adapted when energized to cause a first indexing movement of said electrodes and upon subsequent deenergization to cause a second indexing movement of said electrodes, said control device being adapted to be energized in response to conduction in said first discharge device, means associated with said first and second discharge devices adapted in response to initiation of conduction in one of said discharge devices to render the other of said discharge devices non-conductive, control signal means in said first and second control circuits, and means associated with said welding apparatus and responsive to the termination of a welding operation therein to energize said signal means alternately in said first and second control circuits whereby conduction in said first and second discharge devices is initiated alternately in response to termination of succeeding welding operations.

3. In control apparatus for electric resistance welding apparatus of the type adapted to perform a plurality of spaced welds in controlled sequence and including means adapted upon alternate energization and deenergization in succeeding control cycles to cause indexing movement of welding electrodes; the combination of a D. C. power supply, first and second gaseous discharge devices connected across said power supply, means associated with said discharge devices operative in response to initiation of conduction in one of said discharge devices to render the other of said discharge devices nonconductive, a control device adapted when energized to cause a first indexing movement of said electrodes and when subsequently deenergized to cause a second indexing movement of said electrodes, said control device being adapted to be energized in response to conduction in said first discharge device, first control means for said discharge devices adapted to maintain the same normally non-conductive, and second control means for said discharge devices associated with said welding apparatus and adapted in response to termination of a welding operation therein to render one of said discharge devices conductive and responsive to the termination of a next succeeding welding operation to render the other of said discharge devices conductive.

4. In control apparatus for electric resistance welding apparatus of the type adapted to perform a plurality of spaced welds in a controlled sequence and including means adapted upon alternate energization and deenergization in succeeding control cycles to cause indexing movement of welding electrodes; the combination of a power supply, a control device adapted when energized to cause a first indexing movement of said electrodes and when subsequently deenergized to cause a second indexing movement of said electrodes, electric valve means connected to said power supply and adapted when conducting to energize said control device, and means associated with said welding apparatus and said electric valve means operative responsive to the termination of alternate ones of a series of welding operations in said apparatus to render said valve means conductive and operative responsive to the termination of alternate welding operations intermediate said alternate ones to render said valve means non-conductive.

5. In a sequence control circuit for use with electric resistance welding apparatus of the type adapted to perform a plurality of spaced welds in controlled time sequence and including actuating means for effecting indexing movement of welding electrodes between succeeding welds and where the magnitude of said indexing movement may be adjusted; the combination of a weld contactor for timing the duration of a weld, means operative in response to completion of a weld to energize said actuating means to cause indexing movement, and time delay means operative a predetermined time after energization of said actuating means to energize said contactor, said time delay means including an adjustable component whereby said last mentioned predetermined time may be adjusted commensurately with the magnitude of said indexing movement.

6. In a sequence control circuit for use with electric resistance welding apparatus of the type adapted to perform a plurality of spaced welds in controlled time sequence and including actuating means for effecting indexing movement of welding electrodes between succeeding welds and where the magnitude of said indexing movement may be adjusted; the combination of an electrically operated control device for said actuating means operative when energized to cause a first indexing movement of said electrodes and when subsequently deenergized to cause a second indexing movement of said electrodes, switching means for controlling energization of said control device, said switching means being adapted on alternate ones of a series control cycles to energize said control device and on alternate control cycles intermediate said alternate ones to deenergize said control device, a weld contactor, and time delay means for energizing said contactor a predetermined time after operation of said switching means in each control cycle, said time delay means including an adjustable component whereby said predetermined time may be adjusted commensurately with the magnitude of said indexing movement.

7. In a sequence control circuit for use with electric resistance welding apparatus of the type adapted to perform a plurality of spaced welds in controlled time sequence and including actuating means for effecting indexing movement of welding electrodes between succeeding welds and where the magnitude of said indexing movement may be adjusted; the combination of a weld contactor including means to time the duration of a weld, energizing means for said weld contactor, a control device for said actuating means, means responsive to deenergization of said contactor to operate said control device to cause indexing movement of said electrodes, said energizing means including adjustable time delay means adapted a predetermined time after operation of said control device to energize said contactor.

8. In a sequence control circuit for use with electric resistance welding apparatus of the type adapted to perform a plurality of spaced welds in controlled time sequence and including actuating means for effecting indexing movement of welding electrodes between succeeding welds and where the magnitude of said indexing movement may be adjusted; the combination of a weld contactor having means to time the duration of a weld, energizing means for said weld contactor, a control device for said actuating means, and control means to operate said control device to cause indexing movement of said electrodes between succeeding ones of a plurality of welds, said energizing means including adjustable time delay means adapted a predetermined time after operation of said control device to energize said contactor.

JOSEPH J. RILEY.
RICHARD ALM.

References Cited in the file of this patent

UNITED STATES PATENTS

| Number | Name | Date |
|---|---|---|
| 2,493,839 | Thomas | Jan. 10, 1950 |